US012743055B2

(12) United States Patent
Bonke

(10) Patent No.: US 12,743,055 B2
(45) Date of Patent: Sep. 22, 2026

(54) WRISTWATCH WITH A CLOCK GENERATOR ASSEMBLY

(71) Applicant: Realization Desal AG, Oberwil bei Zug (CH)

(72) Inventor: Michael Bonke, Oberwil bei Zug (CH)

(73) Assignee: REALIZATION DESAL AG, Oberwil (CH)

( * ) Notice: Subject to any disclaimer, the term of this patent is extended or adjusted under 35 U.S.C. 154(b) by 817 days.

(21) Appl. No.: 17/916,216

(22) PCT Filed: Dec. 17, 2021

(86) PCT No.: PCT/EP2021/086475

§ 371 (c)(1),
(2) Date: Sep. 30, 2022

(87) PCT Pub. No.: WO2022/144192

PCT Pub. Date: Jul. 7, 2022

(65) Prior Publication Data

US 2023/0161298 A1 May 25, 2023

(30) Foreign Application Priority Data

Dec. 30, 2020 (DE) ......................... 102020135100.3

(51) Int. Cl.

*G04F 5/06* (2006.01)
*G04D 3/00* (2006.01)
*G04D 7/12* (2006.01)

(52) U.S. Cl.

CPC ............. *G04F 5/06* (2013.01); *G04D 3/0069* (2013.01); *G04D 7/1257* (2013.01)

(58) Field of Classification Search

CPC ...... G04F 5/06; G04D 7/1257; G04D 3/0069; G04C 3/12

See application file for complete search history.

(56) References Cited

U.S. PATENT DOCUMENTS

| | | | |
|---|---|---|---|
| 4,708,491 | A | 11/1987 | Luitje |
| 7,679,466 | B1 | 3/2010 | Cioffi et al. |

(Continued)

FOREIGN PATENT DOCUMENTS

| | | | |
|---|---|---|---|
| DE | 69319812 | T2 | 2/1999 |
| DE | 19843501 | C2 | 7/2003 |

(Continued)

OTHER PUBLICATIONS

Partial Wikipedia article "Crystal oscillator" (Captured by the Internet Archive on Apr. 26, 2019) (Year: 2019).*

(Continued)

*Primary Examiner* — Edwin A. Leon
(74) *Attorney, Agent, or Firm* — Tucker Ellis LLP

(57) ABSTRACT

The invention relates to a wristwatch with a clock generator assembly. The clock generator assembly includes a first clock generator, a pulse counter, and an output device. The first clock generator includes a piezoelectric oscillating crystal and is configured to generate a clock signal. The pulse counter is configured to count the clock signal of the first clock generator, wherein the output device is configured to output a useful signal if a count value of the counted clock signal of the first clock generator is equal to a predetermined count value.

20 Claims, 2 Drawing Sheets

(56) References Cited

U.S. PATENT DOCUMENTS

Figure 1:
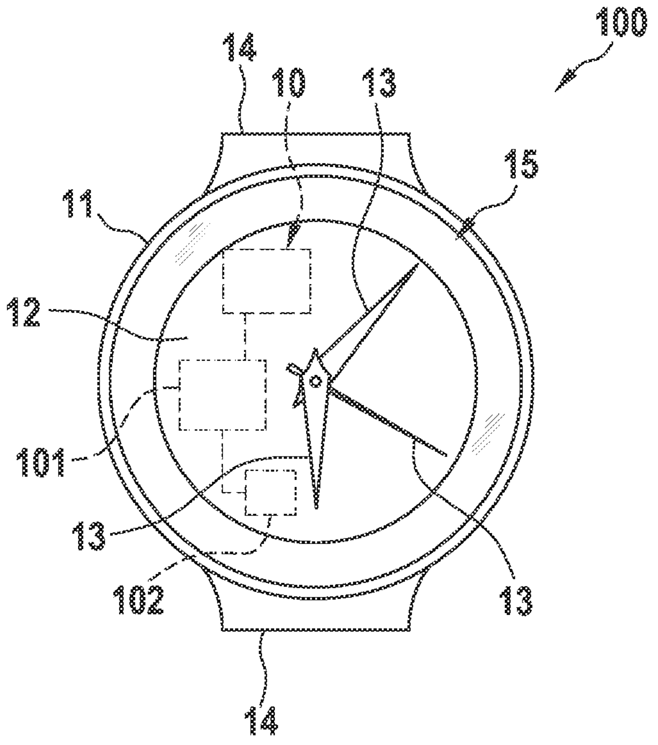

| | | | | |
|---|---|---|---|---|
| 2005/0231069 | A1 | 10/2005 | Yamazaki et al. | |
| 2012/0146737 | A1 | 6/2012 | Wen et al. | |
| 2012/0243384 | A1 | 9/2012 | Funabiki | |
| 2012/0306580 | A1 | 12/2012 | Ellis | |
| 2018/0091156 | A1* | 3/2018 | Maki | H03L 7/085 |
| 2019/0286062 | A1* | 9/2019 | Yamamoto | G04C 3/165 |
| 2022/0345104 | A1* | 10/2022 | Salt | H03H 9/0519 |

FOREIGN PATENT DOCUMENTS

| | | | | | |
|---|---|---|---|---|---|
| JP | S60218092 | A | | 10/1985 | |
| JP | 2004289478 | A | | 10/2004 | |
| JP | 2005084038 | A | | 3/2005 | |
| JP | 2007010401 | A | | 1/2007 | |
| JP | 2009036673 | A | * | 2/2009 | G04G 5/00 |
| JP | 2013092422 | A | | 5/2013 | |

OTHER PUBLICATIONS

Partial machine translation of Fujisawa (JP 2009036673 A) (Year: 2009).*

Partial Wikipedia article "Quartz" (Captured by the Internet Archive on Aug. 15, 2019) (Year: 2019).*

"Crystal Oscillators", A. Schure, published 1955 by Rider Publisher, Inc. (Year: 1955).*

International Search Report from International Application No. PCT/EP2021/086475, mailed on Mar. 28, 2022, 4 pages.

Office Action from corresponding German Application No. 10 2020 135 100.3 mailed on Oct. 14, 2021, 4 pages.

Digitale Messtechnik. In: Wikipedia, Die freie Enzyklopädie. Bearbeitungsstand: Sep. 12, 2019, URL: https://de.wikipedia.org/wiki/Digitale_Messtechnik [abgerufen am Oct. 13, 2021].

* cited by examiner

WRISTWATCH WITH A CLOCK GENERATOR ASSEMBLY

RELATED APPLICATION DATA

This application is a National Phase Application of International Application No. PCT/EP2021/086475 filed Dec. 17, 2021, which claims benefit of German Application No. DE 10 2020 135 100.3 filed Dec. 30, 2020, the entireties of which are incorporated by reference herein.

The invention relates to a wristwatch with a clock generator assembly. The invention also relates to a method for producing such a wristwatch.

Wristwatches with clock generator assemblies are known from the prior art, each of which includes an oscillating quartz as a clock generator. In an oscillator circuit, this oscillates, as the name suggests, at a predetermined oscillation frequency. In most cases, the oscillating quartz is shaped in such a way that the predetermined oscillation frequency is standardized and amounts to 32768 Hz. The oscillation frequency is then divided by two by an electronic circuit until the second cycle is reached. Due to the high frequency of the oscillating quartz, a wristwatch equipped with an oscillating quartz serving as a clock generator, which is also known as a quartz wristwatch, is significantly more accurate than a mechanical watch. A clock generator assembly with an oscillating quartz serving as a clock generator offers the further advantage that the clock generator assembly takes up little space in the watch. Furthermore, the quartz watch has a high power reserve and therefore does not have to be adjusted often. In addition, an oscillating quartz can be produced synthetically at low cost. For these reasons, quartz wristwatches are worldwide widespread. However, an otherwise expensive and high-quality quartz wristwatch can be considered as "mass product" by watch lovers. Moreover, the halving of the oscillation frequency in order to get to the second cycle only works with standardized oscillating quartzes. With other types of oscillating crystals, the effort would be enormous to trim them individually to a fundamental frequency that can be divided by 2.

It is therefore the object of the invention to propose a wristwatch that, on the one hand, has a high timing accuracy, a compact design and a high power reserve and, on the other hand, can be formed individually so that the wristwatch is considered to be of high quality.

Said object is achieved by a wristwatch with the combination of features according to independent claim 1. The sub-claims relate to advantageous developments and embodiments of the invention.

In particular, the wristwatch includes a first clock generator, a pulse counter and an output device. The first clock generator comprises a piezoelectric oscillating crystal and is configured to generate a clock signal. Here, the pulse counter is configured to count a clock signal of the first clock generator. The output device is configured to output a useful signal (wanted signal) if a count value of the counted clock signal of the first clock generator is equal to a predetermined count value.

If the count value of the counted clock signal of the first clock generator and the predetermined count value are the same, the pulse counter is preferably reset. The comparison of the count value of the counted clock signal with the predetermined count value can advantageously be carried out by means of a comparator, which can be part of the pulse counter or the output device. The predetermined count may preferably be stored in a memory of the clock generator assembly.

The present invention enables a wristwatch having a clock generator assembly that can provide an accurate useful signal. Particularly by outputting the useful signal if the count value of the counted clock signal of the clock signal of the first clock generator matches the predetermined count value, it can be ensured that the useful signal is output at the correct point in time.

The proposed clock generator assembly and in particular the use of a pulse counter for counting the clock signal of the first clock generator provides the particular advantage that not only piezoelectric oscillating crystals with a standardized oscillation frequency can be used, but any piezoelectric oscillating crystal. This makes it possible to use individualized frequencies that, under certain circumstances, also occur once, quite specifically for a unique oscillating crystal.

Thus, a natural oscillating crystal that cannot be standardized or is difficult to be standardized, the chemical composition, purity or other factors of which almost always vary slightly, whereby the oscillation frequency in the crystal always varies individually, can also be used as the piezoelectric oscillating crystal of the first clock generator. Thus, for example, a natural tourmaline, a natural amethyst or other quartz varieties such as citrine, etc., or a natural Swiss rock crystal can be used. In this case, it is also possible to dispense with the shaping of each individual natural oscillating crystal until it has reached the desired oscillation frequency of 32678 Hz, what would otherwise be very complex due to the not so homogeneous chemical composition of the oscillating crystal. In other words, because of the fact that the oscillation frequency of a natural oscillating crystal usually varies somewhat, depending on the chemical composition of the oscillating crystal, it is hardly possible to simply produce a standardized geometry of the oscillating crystal and thus hit the exact oscillation frequency of 32678 Hz. The geometry of the natural oscillating crystal would thus have to vary slightly for each individual oscillating crystal of the same type/material (e.g. tourmaline) in order to arrive at a clear oscillation frequency of 32678 Hz or at another frequency that can be broken down to the frequency of 1 Hz with a bisecting frequency divider. However, this problem is cleverly solved by the use of the pulse counter in the clock generator assembly of the proposed wristwatch.

Furthermore, non-randomly variable frequencies can also be processed by means of the pulse counter of the proposed wristwatch, e.g. the Chinese "lucky number" of 8888 or 88888, which can then be achieved in quantities via the geometry of a synthetic quartz.

Since a plurality of piezoelectric oscillating crystals, which can also have any oscillation frequency, lend themselves for the first clock generator, the wristwatch according to the present invention can be individualized, which gives the wristwatch a high-quality flair. At the same time, the wristwatch according to the present invention has the advantages of a compact design and accuracy of a conventional quartz wristwatch with a synthetic quartz crystal.

The predetermined count value is advantageously characteristic for the particular piezoelectric oscillating crystal, i.e. in particular for the specific shape and chemical composition of the oscillating crystal provided in the clock generator assembly of the wristwatch. Thus, an individually predetermined count value that is programmed into the comparator when manufacturing the clock generator assembly pertains to each oscillating crystal.

As will also be explained in more detail later, in order to determine the predetermined count value, the piezoelectric oscillating crystal can advantageously be made to oscillate and the clock signal generated by the oscillation of the oscillating crystal can be counted, e.g. with a frequency counter (counting frequency meter), before all components of the clock generator assembly for manufacturing the clock generator assembly are put together or configured.

If the used piezoelectric oscillating crystal has an oscillation frequency which is dependent on a temperature of the oscillating crystal, the predetermined count value is advantageously characteristic for the specific piezoelectric oscillating crystal, i.e. in particular for the specific shape and the specific chemical composition of the oscillating crystal provided in the clock generator assembly, at a predetermined temperature of the clock generator assembly or rather the oscillating crystal or a predetermined temperature of the environment of the clock generator assembly or rather the oscillating crystal.

Here, the predetermined temperature can advantageously be selected as the temperature at which the clock generator assembly or the wristwatch will be operated in normal operation. A temperature substantially corresponding to a mixed temperature of a normal skin temperature of a healthy person and the temperature of the ambient air of the wristwatch can be preferably selected as the predetermined temperature.

In order to be able to apply an electrical voltage to the piezoelectric oscillating crystal of the first clock generator, the first clock generator preferably also comprises electrodes, which are arranged on the piezoelectric oscillating crystal or connected to the piezoelectric oscillating crystal.

It is noted at this point that, within the context of the present invention, by "oscillating crystal" no raw crystal, but a faceted crystal, in particular a cut or otherwise processed, e.g. etched, crystal is advantageously understood.

Furthermore, within the context of the present invention, an oscillating crystal made of a specific material means an oscillating crystal the highest proportion of which is formed from this material, particularly preferably an oscillating crystal that is formed entirely from this material. Thus, for example, within the context of the present invention, a tourmaline oscillating crystal means an oscillating crystal whose highest proportion is formed of tourmaline, particularly preferably an oscillating crystal that is formed entirely from tourmaline.

Preferably, the clock generator assembly further comprises a second clock generator comprising a piezoelectric oscillating crystal. Here, the second clock generator is configured to generate a clock signal. The output device is configured to compare the clock signal of the second clock generator with the clock signal of the first clock generator. By comparing the clock signal of the second clock generator with the clock signal of the first clock generator, the accuracy of the clock signal of the first clock generator can be checked.

In particular, the second clock generator is configured to generate the clock signal at predetermined time intervals, e.g. every 15 minutes. In other words, the second clock generator is only operated at predetermined time intervals. That is, the oscillating crystal of the second clock generator is made to oscillate only at predetermined time intervals. The comparison between the clock signal of the first clock generator and the clock signal of the second clock generator can thus also take place at predetermined time intervals. Thereby, a power saving can be reached.

Switching-on and -off the second clock generator can preferably be carried out by a further pulse counter with a comparator (second comparator), which is controlled by the output signal of the first comparator and counts that up. If the first comparator e.g. delivers a seconds signal, then one can let this additional pulse counter count up to 1024 (10 bit) (approx. 17 minutes) and does not even have to reset it. If this further pulse counter is equipped with more than one comparator, then the second clock generator can be switched on and off for different time intervals (e.g. every 17 minutes with a duty cycle of 4 s). It is also possible to divide the seconds signal (1 Hz signal) with a frequency divider, whereby the period duration (here: 1 s) can be further increased by duplications. With a 10-bit divider, one can then come to 1024 s or 17 minutes and control the second clock generator accordingly. If this frequency divider has exactly 10 bits and is not stopped, then it starts over again and again, that is, the second clock generator is switched on every 17 minutes. If the second clock generator is only driven with the most significant bit, then it will run at a time for 8.5 minutes and then be switched off again. However, a less significant bit can also be used: the least significant bit has a period of 2 s, is thus switched on for 1 s and switched off for 1 s. For example, the third lowest bit (period 8 s) is 4 s on and 4 s off. These two bits can be interconnected in such a way that the second clock generator is switched on by the rising edge of the most significant bit and switched off again by the falling edge of the third least significant bit. Then it runs for four seconds every 17 minutes.

Alternatively, the second clock generator is configured to continuously generate a clock signal (second clock signal).

The output device is preferably configured to output the useful signal if a count value of the counted current clock signal is equal to the predetermined count value, only when a deviation between the clock signal of the second clock generator and the clock signal of the first clock generator is less than a predetermined deviation. In other words, the useful signal is output based on the clock signal of the first clock generator only if a deviation between the clock signal of the second clock signal and the current clock signal is less than a predetermined deviation.

According to an advantageous embodiment of the invention, the second clock generator is a substitute clock generator and its clock signal is a substitute clock signal. If a deviation between the clock signal of the second clock generator and the clock signal of the first clock generator is greater than the predetermined deviation, the output device is advantageously configured to output a useful signal based on the substitute clock signal of the substitute clock generator instead of based on the clock signal of the first clock generator. In other words, in the case of a greater deviation between the clock signal of the second clock generator and the clock signal of the first clock generator than the predetermined deviation, the second clock advantageously assumes the role of the clock generator of the clock generator assembly of the wristwatch. It can thus be ensured that the clock generator assembly outputs an accurate useful signal even if there are interference factors that affect the accuracy of the first clock generator or cause the clock signal of the first clock signal to deviate from the clock signal of the second clock generator. Such an interference factor can be, for example, the temperature at which the clock generator assembly is operated. If the temperature at which the wristwatch or rather the clock generator assembly is operated deviates from the temperature at which the predetermined count value of the clock signal of the first clock generator was determined, this can, in the case of an oscillating crystal for the first clock generator, the oscillation frequency of which can be temperature-dependant, result in a deviation of the clock signal of the first clock generator from that at the predetermined temperature.

The second clock generator is advantageously formed or selected in such a way that it can generate a clock signal that is constant or rather independent from interference factors or, compared to the first clock generator, less sensitive to interference factors, so that this clock signal can be used as a substitute clock signal of the clock generator assembly.

Particularly if the second clock generator comprises a piezoelectric oscillating crystal made of quartz, the useful signal based on the clock signal of the second clock generator can be generated by means of a frequency divider. The frequency divider can be formed as part of the output device or as a separate element.

If a deviation between the clock signal of the second clock generator and the current clock signal is greater than the predetermined deviation, as an alternative to outputting a useful signal based on the clock signal of the second clock generator, the output device can advantageously be configured to correct the predetermined count value by means of a predetermined correction factor. In doing so, the output device is also configured to output the useful signal if the count value of the clock signal of the first clock generator is equal to the corrected predetermined count value.

The accuracy of a frequency-controlled watch with a piezoelectric oscillating crystal as the clock generator is primarily dependent on that the piezoelectric oscillating crystal is exposed to exactly the same conditions and thus has an absolutely constant oscillation frequency. In this case, the condition of temperature can trigger the greatest oscillation frequency change, what means that a temperature correction in the watch is the most important control mechanism that ensures the accuracy of the watch.

In order to achieve an accurate correction of the predetermined count value in the case of a temperature difference, the predetermined correction factor can preferably be based on a predetermined temperature dependency of the oscillation frequency of the piezoelectric oscillating crystal of the first clock generator, a predetermined temperature dependency of the oscillation frequency of the piezoelectric oscillating crystal of the second clock generator and a difference between a count value of the counted clock signal of the first clock generator and a count value of the counted clock signal of the second clock generator. In this case, the oscillation frequency of the piezoelectric oscillating crystal of the first clock generator advantageously has a different temperature dependence than the oscillation frequency of the piezoelectric oscillating crystal of the second clock generator. In other words, the piezoelectric oscillating crystal of the first clock generator has a different oscillation behavior as a function of the temperature than the piezoelectric oscillating crystal of the second clock generator. This can be achieved in particular by the piezoelectric oscillating crystal of the first clock generator and the piezoelectric oscillating crystal of the second clock generator being formed from different materials and/or having different geometries and/or differing from one another by at least one property that influences the oscillation behavior as a function of the temperature. Such a property can be, for example, the oscillation type, the chemical composition or the purity of the piezoelectric oscillating crystals. Thus, for example, two tourmalines of different geometry or oscillation type, or a tourmaline and an amethyst can be used as the oscillating crystals of the first clock generator and the second clock generator.

In other words, the temperature dependencies of the first clock generator and the second clock generator should advantageously be available. These are advantageously established by means of different frequency measurements at different temperatures before the wristwatch is created. Then, in particular, a curve derived therefrom is created, which represents a specific oscillation frequency deviation for each temperature. If, for example, there is a temperature deviation from a predetermined temperature (specified standard temperature) of −5° C., the oscillation frequency deviation has a value, wherein for example at a temperature deviation of −8° C. the oscillation frequency deviation has a different value. After generating the frequency difference curve from the comparison of the two temperature dependencies of the oscillation frequencies of the two oscillating crystals of the first clock generator and the second clock generator, another curve is created, which in turn is based on the temperature dependence of the oscillation frequency of the first clock generator. This advantageously contains the correction values, which for each ° C. temperature difference represent the factor by which the predetermined count value must be corrected, so that this is adapted to the altered temperature.

Then, for each determined oscillation frequency difference or for each determined difference between a count value of the counted clock signal of the first clock generator and a count value of the counted clock signal of the second clock generator, the predetermined count value can be corrected such that it is ensured that the useful signal always has the same frequency regardless of potential temperature fluctuations, e.g. 1 Hz.

This is particularly advantageous when the oscillation frequency of the piezoelectric oscillating crystal of the first clock generator is highly susceptible to temperature fluctuations. Tourmaline can be an example of such an oscillating crystal. The tourmaline is an individual oscillating crystal in which the temperature dependence of the oscillation frequency is not necessarily subject to a clear rule. This means that the change in frequency in a tourmaline crystal can be different from another tourmaline crystal with the same geometry. This deviation hardly ever occurs in a quartz wristwatch, since the oscillating quartzes used for such watches are usually synthetically manufactured and the temperature dependence of the oscillation frequency is therefore approximately the same in all oscillating quartzes with the same geometry. Nevertheless, quartz also shows a temperature dependency of the oscillation frequency, which can be recorded in a corresponding curve. Thus, a correction of the predetermined count value can result in an increase in the accuracy of the wristwatch even in the case of an oscillating crystal formed as a quartz crystal for the first clock generator.

As can be seen from the above description, the oscillating crystal of the second clock generator does not have to be a quartz crystal in order to achieve the correction of the predetermined count value. In other words, the comparison curve of the two oscillating crystals described above does not have to be created from the comparison of the piezoelectric oscillating crystal of the first clock generator with an oscillating quartz, but it can just as well be created from the comparison of the piezoelectric oscillating crystal of the first clock generator with another piezoelectric oscillating crystal. For example, the oscillating crystals of both the first clock generator and the second generator can be made of tourmaline. However, both oscillating crystals must then be measured with regard to the dependence of their oscillation frequency on the temperature, while the temperature-deviation-frequency curve is usually either already known for an oscillating quartz, or must be created only once for an oscillating quartz for a whole series of wristwatches, since one can assume that this goes analogously for all synthetically produced oscillating quartzes.

Preferably, the clock generator assembly may comprise a temperature sensor. The temperature sensor is configured to detect a temperature of the first clock generator and/or an environment of the first clock generator and to compare this with a predetermined temperature.

If a deviation between the temperature of the first clock generator and/or an environment of the first clock generator and the predetermined temperature is greater than a predetermined temperature deviation, the output device is advantageously configured to correct the predetermined count value based on the detected temperature. Furthermore, the output device is configured to output the useful signal based on the first clock generator if the count value of the counted clock signal of the first clock generator is equal to the corrected predetermined count value. Thus, piezoelectric oscillating crystals from materials, e.g. tourmaline types, the oscillation frequency of which is temperature-dependent, can also be used in the clock generator assembly.

Alternatively or in addition to the correction of the predetermined count value based on the detected temperature, the wristwatch can advantageously further have a heating device. The heating device is configured to heat the first clock generator to the predetermined temperature in the case of a temperature deviation between the temperature of the first clock generator and/or an environment of the first clock generator and the predetermined temperature that is greater than a predetermined temperature deviation. Detecting a temperature deviation between the temperature of the first clock generator and/or an environment of the first clock generator and the predetermined temperature can here be carried out also by using the above described mechanism of comparing the oscillation frequencies of the oscillating crystals of the first clock generator and the second clock generator with one another instead of using the temperature sensor. This is possible because the current temperature of the first clock generator and/or its environment can be determined from the difference in the oscillation frequencies of the two oscillating crystals. Thus, the difference between the current temperature and the predetermined temperature, which has to be eliminated by the heating device, is then also known.

Preventing a frequency deviation of the clock signal of the first clock generator due to a temperature deviation of the temperature of the first clock generator and/or an environment of the first clock generator from the predetermined temperature by means of one of the described correction mechanisms can be particularly advantageous since the wristwatch is worn on the wrist of a person which does however not always have a constant temperature. For example, in the event of illness, a wristwatch having a clock generator assembly with a first clock generator from tourmaline, the oscillation frequency of which depends on temperature, would not be accurate without the proposed temperature correction mechanism. If the wearer of the wristwatch had for example a slightly elevated temperature (e.g. 38° C. instead of 36° C.), the wristwatch could go without the previously described temperature mechanism e.g. 8 seconds behind. The accuracy of the wristwatch would also be affected in the case that the watch is not always worn.

Preferably, the clock generator assembly further comprises a third clock generator. The third clock generator comprises a piezoelectric oscillating crystal and is configured to generate a clock signal. Here, the output device is configured to compare the clock signal of the third clock generator, the clock signal of the second clock generator and the clock signal of the first clock generator with one another. With the introduction of the third clock generator, for example a synthetic standardized quartz crystal, if oscillation frequency deviations are measured between all three oscillating crystals, deviations that cannot be attributed to a temperature deviation but to aging of the oscillating crystals can also be determined. Hence, these age-related frequency deviations can also be corrected. By aging is meant an oscillation frequency deviation that occurs over time due to the penetration of the crystals by foreign atoms or other circumstances related to time.

It is noted that within the context of the invention the first clock generator is the primary clock generator of the wristwatch. The second clock generator and/or the third clock generator can serve as a substitute clock generator if it is determined that the timing accuracy of the first clock generator is not high enough, and/or are to be understood as control clock generators so that the accuracy of the first clock generator can be checked and corrected if necessary.

According to an advantageous embodiment of the invention, the wristwatch further comprises a driving device and a mechanical time display device. In this case, the driving device is configured to receive the useful signal output by the output device of the clock generator assembly and, in response thereto, to move the mechanical time display device for display the time. Such a wristwatch can be referred to as a wristwatch with a mechanical movement within the context of the invention.

Preferably, the driving device comprises a driving element and in particular also a transmission device that connects the driving element to the mechanical time display device and translates a movement of the driving element into a movement of the mechanical time display device.

The driving element can preferably be formed as an electric stepping motor, in particular as a Lavet stepping motor, or as another type of electromechanical drive. The transmission device can preferably be formed as a wheel train. The driving element can alternatively be connected directly to the mechanical time display device, i.e. without the interposition of a transmission device.

The mechanical time display device can preferably have at least one hand and/or a dial, in particular with at least one time marking. Here, the driving device can be configured to move or rather rotate the at least one hand and/or the dial of the time display device.

According to an alternative advantageous embodiment of the invention, the wristwatch can be formed as an electronic wristwatch. In addition to the clock generator assembly, the wristwatch comprises an electronic circuit and an electronic time display device. The electronic circuit is in this case configured to receive the useful signal output by the output device of the clock generator assembly and, in response to this, to output a signal to the time display device for displaying the wristwatch.

The piezoelectric oscillating crystal of the first clock generator and/or the second clock generator and/or the third clock generator can be a natural or synthetic crystal. In particular, the piezoelectric oscillating crystal of the first clock generator and/or the second clock generator and/or the third clock generator can be a natural tourmaline, citrine, amethyst, Swiss rock crystal or a synthetic quartz crystal. It is noted that citrine and amethyst are color varieties of (natural) quartz. Specifically, citrine is the yellow colored variety and amethyst is the violet variety of quartz If the piezoelectric oscillating crystal of the first clock generator and/or the second clock generator and/or the third clock generator is a quartz crystal, the piezoelectric oscillating crystal is preferably formed as a fork oscillator with two prongs. Alternatively to the fork oscillator, the piezoelectric oscillating crystal can also have the shape of a small plate. In other words, the piezoelectric oscillating crystal can also be in the form of a small quartz plate. Preferably, the small quartz plate is round. However, it is also possible for the small quartz plate to be rectangular.

According to an advantageous embodiment, the oscillation frequency of the piezoelectric oscillating crystal of the first clock generator is 8888 Hz or 88888 Hz. This means in other words, that the frequency of the clock signal is 8888 Hz or 88888 Hz or that the predetermined count value is accordingly equal to 8888 or 88888. In this case, the piezoelectric oscillating crystal of the first clock generator can preferably be a quartz oscillating crystal, in particular a synthetic quartz oscillating crystal.

According to an advantageous embodiment, the output device is configured to output the useful signal with a frequency of 8 Hz if the count value of the counted clock signal of the first clock generator is equal to a predetermined count value. This means that an oscillation frequency of the piezoelectric oscillating crystal, in other words the frequency of the clock signal or the predetermined count value is set in such a way that the useful signal has the frequency of 8 Hz. In this case, the piezoelectric oscillating crystal of the first clock generator can preferably be a quartz oscillating crystal, in particular a synthetic quartz oscillating crystal.

If the oscillation frequency of the piezoelectric oscillating crystal of the first clock generator is 8888 Hz or 88888 Hz and the output device is configured to output the useful signal with a frequency of 8 Hz, the predetermined count value is set to 1111 or 11111. Thus, a useful signal is output by the output device if the pulse counter counts 1111 or 11111 pulses, i.e. if the count value of the counted clock signal of the first clock generator is equal to 1111 or 11111. In this design of the wristwatch, the frequency of the clock signal is 8888 Hz or 88888 Hz and the frequency of the useful signal is 8 Hz.

If the oscillation frequency of the piezoelectric oscillating crystal of the first clock is 8888 Hz and the piezoelectric oscillating crystal is a quartz crystal, particularly a synthetic quartz crystal, and is formed as a fork oscillator with two prongs, the length of each prong is preferably 3.02127 mm, the thickness of each prong preferably 0.3 mm and the depth of each prong would be variable, e.g. 0.6 mm. If the oscillation frequency of the piezoelectric oscillating crystal of the first clock generator is 88888 Hz and the piezoelectric oscillating crystal is a quartz crystal, particularly a synthetic quartz crystal, and is formed as a fork oscillator with two prongs, the length of each prong is preferably 0.55155 mm, the thickness of each prong preferably 0.1 mm and the depth of each prong either 0.3 mm or another practical value as the depth is variable and does not affect frequency.

The length of each prong corresponds in particular to the dimension of the respective prong in a direction parallel or substantially parallel to the Y-crystal axis, the thickness of a respective prong to the dimension of the respective prong in a direction parallel or substantially parallel to the X-crystal axis and the depth of a respective prong to the dimension of the respective prong in a direction parallel or substantially parallel to the Z-crystal axis of the piezoelectric oscillating crystal of the first clock generator, namely the quartz oscillating crystal. "Substantially parallel" means in particular an angle of up to 20 degrees, preferably 10 degrees, further preferably 5 degrees, to the respective axis. The Z-crystal axis corresponds to a longitudinal crystallographic axis of the raw quartz crystal or the starting synthetic quartz from which the quartz oscillating crystal is formed. The longitudinal axis is the axis representing the direction of growth or the direction of crystallization of the quartz. In quartz, the crystal structure is hexagonally symmetrical about the longitudinal axis. The Z-crystal axis is also understood as the optical axis of the quartz. In quartz, the X-crystal axis is understood as that axis, which, on the one hand, runs perpendicular to the Z-crystal axis (longitudinal axis) and, in relation to the hexagonal cross-section of the quartz crystal, runs through two opposite edges (of the 6 existing edges) of the quartz crystal. Thus, there are three possible X-crystal axes in quartz. The Y-crystal axis in quartz is understood to be that axis which runs parallel to the normal vector of any two opposing ones of the six quartz faces, which run parallel to the longitudinal axis of the quartz. Thus, quartz has three possible Y-crystal axes.

Preferably, the piezoelectric oscillating crystal of the first clock generator and/or the second clock generator and/or the third clock generator can preferably be a tourmaline oscillating crystal and have the shape of a small plate, in particular a round small plate. This form is particularly advantageous for the tourmaline oscillating crystal, since a raw tourmaline crystal is generally not absolutely pure and homogeneous like, for example, a synthetic raw quartz crystal, from which a quartz oscillating crystal is preferably formed as a fork oscillator.

Because the prongs of a fork oscillator are often, depending on the desired vibration frequency, not that thick, in the case of a tourmaline fork oscillator, an alteration in the fork oscillator and thus also its oscillation frequency due to natural mineral deposits, twin lines or structural changes over the years due to the constant oscillation could not be ruled out. However, this can be prevented or at least reduced by the small-plate shape.

If possible, the tourmaline small plate should not be very large. This reduces the likelihood that there will be an imperfection in the tourmaline crystal that will cause problems over time. In the case of a rectangular small plate, it can be advantageous if the length of a side of the plate is between 2.9 mm and 3.1 mm, in particular 3 mm. If the piezoelectric oscillating crystal is in the form of a round small plate, it can be advantageous if the diameter of the round small plate is between 2.9 mm and 3.1 mm, in particular 3 mm.

Here, a normal vector of a main surface of the respective small plate is in particular parallel to the longitudinal crystal axis of the corresponding tourmaline oscillating crystal or inclined at an angle of 45° to the longitudinal crystal axis of the corresponding tourmaline oscillating crystal.

Alternatively, the piezoelectric oscillating crystal of the first clock generator and/or the second clock generator and/or the third clock generator can be an amethyst oscillating crystal or a citrine oscillating crystal and have the shape of a small plate, in particular a round small plate. Here, a main surface of the small plate is in particular parallel to a plane defined by the Z-crystal axis and the Y-crystal axis or by the Z-crystal axis and the X-crystal axis of the piezoelectric oscillating crystal. The Z-crystal axis corresponds to a longitudinal crystallographic axis of the raw crystal from which the piezoelectric oscillating crystal is formed.

The term "small plate" means in particular a slice-shaped. Thus, within the context of the invention, a small plate can also be referred to as a slice. The main surface corresponds to a flat side of the small plate.

Within the context of the invention, the crystal axis of the piezoelectric oscillating crystal is in particular understood as an axis of the crystal lattice of the piezoelectric oscillating crystal. The crystal axis advantageously corresponds within the context of the invention to a crystallographic axis of a raw crystal from which the piezoelectric oscillating crystal is formed.

A further aspect of the present invention relates to a method for producing a wristwatch with a clock generator assembly, in particular a wristwatch with a clock generator assembly as described above. The method comprises the following steps:

- providing a first clock generator, which comprises a piezoelectric oscillating crystal with a predetermined oscillation frequency and is configured to generate a clock signal,
- providing a pulse counter that is configured to count a clock signal of the first clock generator,
- providing an output device,
- storing a predetermined count value, which is derivable from the predetermined oscillation frequency, in a memory of the pulse counter or the output device,
- configuring the output device to output a useful signal if a count of the clock signal of the first clock generator counted by the pulse counter is equal to the predetermined count value, and
- installing the first clock generator, the pulse counter, and the output device in the wristwatch.

Further preferably, the method for producing the wristwatch comprises the steps of providing a driving device, i.e. a driving element and if necessary a transmission device, of providing a power supply device, e.g. a button battery and/or a rechargeable battery and/or a continuous power generator (e.g. thermogenerator), and/or of providing a mechanical time display device.

The driving element can in particular be formed, as described above, as an electric stepping motor, preferably a Lavet stepping motor, and the transmission device can be formed as a gear train. The gear train is advantageously configured to convert the frequency of the useful signal at which the electric stepping motor moves one step further into the movement of the mechanical time display device. Here, the frequency of the useful signal can be translated in such a way that the second hand turns further by 6° per second, the minute hand turns further 6° per minute and the hour hand rotates by 30° per hour.

In addition, for manufacturing the wristwatch, further components such as a crown, a dial, a watch glass, movement switches, etc. can be provided and installed in a watchcase or attached to the watchcase alongside the first clock generator, the pulse counter and the output device.

Preferably, the step of providing the first clock generator with the piezoelectric oscillating crystal having the predetermined oscillation frequency comprises the steps of providing any piezoelectric oscillating crystal, generating an oscillation of the piezoelectric oscillating crystal, and measuring the oscillating piezoelectric oscillating crystal using a frequency counter to determine its oscillation frequency. The measured oscillation frequency corresponds to the predetermined oscillation frequency. Thus, any piezoelectric oscillating crystal can be used, or a raw crystal can be arbitrarily processed to produce a piezoelectric oscillating crystal, wherein its measured oscillation frequency is used as the predetermined oscillation frequency, from which the predetermined count value is derived.

According to an advantageous embodiment, the step of providing the first clock generator with the piezoelectric oscillating crystal, which has the predetermined oscillation frequency, comprises the steps of selecting an oscillation frequency as the predetermined oscillation frequency and of shaping, in particular cutting or another shaping process such as etching, or of refining by material removal by means of a laser, a piezoelectric oscillating crystal from a raw crystal such that the oscillating crystal has the predetermined oscillation frequency. In other words, a piezoelectric oscillating crystal is formed in an advantageous manner so that in its final form it has an intentionally selected and not an arbitrary oscillation frequency. Thus, the wristwatch can be equipped with a first clock generator having a piezoelectric oscillating crystal with an individualized oscillation frequency according to the request of the wearer of the wristwatch. For example, the date of birth of the wearer of the wristwatch can be selected as the oscillation frequency of the piezoelectric oscillating crystal of the first clock generator.

According to an advantageous embodiment, the frequency of 8888 Hz or 88888 Hz is selected as the predetermined oscillation frequency of the piezoelectric oscillating crystal. That is, the piezoelectric oscillating crystal is formed so that its oscillation frequency is 8888 Hz or 88888 Hz.

According to an advantageous embodiment, the predetermined oscillation frequency and/or the predetermined count value is/are selected in such a way that the output device is configured to output the useful signal at a frequency of 8 Hz if the count value of the counted clock signal of the first clock generator matches a predetermined count value.

If the frequency of 8888 Hz or 88888 Hz is selected as the predetermined oscillation frequency of the piezoelectric crystal of the first clock generator and the useful signal is to be output at a frequency of 8 Hz, the predetermined count value is set to 1111 or 11111, respectively.

In order to provide the piezoelectric oscillating crystal of the first clock generator with an oscillation frequency of 8888 Hz, a quartz oscillating crystal is preferably formed as a fork oscillator with two prongs. To this end, the fork oscillator is cut from a quartz slice of a raw quartz crystal or a synthetic quartz crystal. The quartz slice is advantageously cut out from the raw quartz crystal or the synthetic quartz crystal at an angle of 90° to the crystallographic longitudinal axis, or at an angle, which substantially corresponds to this angle. In a next step, the fork oscillator is provided and contacted with electrodes. In a next step, the fork oscillator provided with the electrodes is set into a protective cover, in particular a vacuum bell jar, in order to prevent foreign atoms from migrating through from the ambient air and to facilitate a free oscillation. Furthermore, an oscillator circuit is built, which causes the fork oscillator to oscillate at the predetermined frequency of 8888 Hz or 88888 Hz. The oscillator circuit and the fork oscillator then form the first clock generator. Furthermore, a pulse counter is provided, which breaks down the frequency of 8888 Hz or 88888 Hz of the clock signal to the desired frequency of 8 Hz. The oscillator circuit, which excites the fork oscillator to oscillate, and the pulse counter are preferably located on one and the same microchip. These two units could however also be provided separately from one another.

According to an advantageous embodiment of the invention, the step of providing the first clock generator and/or the second clock generator and/or the third clock generator comprises the following steps:

- shaping, in particular by cutting or etching, of a piezoelectric oscillating crystal from a raw crystal, in particular after a determined alignment of the crystallographic axes of the raw crystal, applying electrodes to the oscillating crystal, e.g. by depositing a wafer-thin layer of gold to the surface of the oscillating crystal, preferably in a lithographic process, connecting the electrodes applied to the oscillating crystal to an oscillator circuit, generating an oscillation of the oscillating crystal, measuring the oscillating crystal and determining its oscillation frequency, i.e. the number of oscillations within a period of a second, by means of a frequency counter, enclosing the oscillating crystal in a holder, in particular wherein the oscillating crystal is able to oscillate in the holder without experiencing great damping, and connecting the electrodes with two connection wires, incorporating the oscillating crystal into a protective cover, preferably vacuum bell jar out of glass or metal, and providing an oscillator circuit which is configured to cause the oscillating crystal to oscillate at the discovered oscillation frequency.

It is noted that an oscillator circuit is advantageously an electronic circuit.

In particular, if the piezoelectric crystal of the first clock generator and/or the second clock generator and/or the third clock generator is a tourmaline crystal and has the shape of a small plate, as described above, the respective clock generator is provided as follows:

First, the tourmaline oscillating crystal is provided in the shape of a small plate. In other words, a tourmaline small plate is formed. To this end, a rectangular small plate can be cut out of a raw tourmaline crystal at an angle of 90° or 45° to the crystallographic longitudinal axis of the raw tourmaline crystal, or at another optimal inclination to the longitudinal axis, which corresponds to the particular chemical composition of the particular tourmaline variety used. Then, the rectangular plate can be preferably cut circular. Advantageously, the two main surfaces of the small plate are polished.

It is noted at this point that the tourmaline has a trigonal structure. In other words, tourmaline does not crystallize with a hexagonal crystal cross-section like quartz, but rather trigonally, i.e. in a triangular shape, with the sides of the triangle usually being somewhat roundly curved. The above described crystallographic longitudinal axis can also be referred to as optical axis. This axis is known as Z-axis or often also as C-axis, but is referred to as L-axis within the context of the invention. The longitudinal axis is the axis representing the direction of growth or the direction of crystallization of the tourmaline. This axis is polar. When heating the raw tourmaline crystal, a pyroelectric charge occurs at the two tips of the raw tourmaline crystal. In particular, in such a case, a positive charge occurs at the one tip and a negative charge occurs at the other tip. Within the context of the invention, that axis of the raw tourmaline crystal that is perpendicular to the crystallographic longitudinal axis and runs through an angle that forms between two of the three facets of the raw tourmaline crystal is referred to as TA axis (TA: Triangle—Angle). Furthermore, within the context of the invention, that axis of the raw tourmaline crystal that is perpendicular to the crystallographic longitudinal axis and runs essentially parallel to the basic direction of one of the three facets of the raw tourmaline crystal is referred to as TS axis (TS: tourmaline side). The raw tourmaline crystal can be described by a structural triangle, the sides of which are assigned to or follow the facets of the raw tourmaline crystal. Thus, the crystallographic longitudinal axis is perpendicular to the plane of the structural triangle. The TA axis is perpendicular to the crystallographic longitudinal axis and passes through an angle ensues between any two of the three sides of the structural triangle. The TS axis is perpendicular to the crystallographic longitudinal axis and parallel to one of the three sides of the structural triangle. Thus, the tourmaline crystal has the following piezoelectric polar axes: an "L" axis, three possible "TS" axes and three possible "TA" axes.

Here, a normal vector of a main surface of the respective small plate is in particular parallel to the longitudinal crystal axis of the corresponding tourmaline oscillating crystal or inclined at an angle of 45° to the longitudinal crystal axis of the corresponding tourmaline oscillating crystal, or at a special optimal angle, depending on the specific chemical composition of the specific tourmaline type used.

In the case of cutting out the plate at an angle of 45° to the crystallographic longitudinal axis, the tourmaline oscillating crystal in the shape of a small plate exhibits high piezoelectric activity. In this case, for a rectangular small plate, one edge of the small plate is parallel to the TS axis or TA axis, wherein the other edge is inclined at 45° to the crystallographic longitudinal axis of the raw tourmaline crystal.

After the tourmaline small plate has been provided, the oscillation frequency of the tourmaline small plate is measured with a frequency-measuring device. Thereby, the frequency at which the tourmaline oscillates with a large amplitude is determined.

For this purpose, the tourmaline small plate is placed between two small metal plates, which are connected to the frequency-measuring device via two wires. It is first determined whether the tourmaline small plate has a frequency with a high amplitude, which is at the same time far enough away from any "side frequencies". If this is the case, it is determined that the tourmaline small plate can be used as an oscillating crystal. Then, the tourmaline small plate is provided with electrodes, preferably by vapor deposition (or sputtering process) of gold electrodes. Any other possible method of applying the electrodes is also applicable.

The oscillating tourmaline is now being fixed and installed in a holder that has as little damping as possible and prevents the free oscillation of the tourmaline as little as possible. In the case of a round tourmaline small plate, the center of the tourmaline small plate is often the best fixing point, since, depending on the type of oscillation, a vibration node may occur here at which the oscillation may have a lower amplitude and accordingly experience less damping through fixing.

The tourmaline small plate is then incorporated into a protective cover, in particular in a vacuum bell jar, in order to prevent foreign atoms from migrating through and to enable air-free oscillation.

After that, the tourmaline small plate, which is provided with electrodes and incorporated into the protective cover, i.e. the tourmaline oscillating crystal, is measured again, whereby the main frequency is determined. This determined main frequency is defined as the oscillation frequency of the tourmaline oscillating crystal.

For forming the respective clock generator with a tourmaline oscillating crystal, an oscillator circuit is provided which is configured to cause the tourmaline oscillating crystal to oscillate at the discovered oscillation frequency.

If the piezoelectric oscillating crystal of the first clock generator and/or the second clock generator and/or the third clock generator is an amethyst oscillating crystal or a citrine oscillating crystal and has the shape of a small plate, in particular a round small plate, the amethyst oscillating crystal or citrine oscillating crystal is for providing the respective clock generator preferably first provided in the shape of a small plate. In other words, an amethyst small plate or a citrine small plate is formed. In the case of an amethyst oscillating crystal in particular, the small plate shape is particularly advantageous, since natural mineral deposits, twin lines or possible structural irregularities in the amethyst raw crystal result in frequencies and side frequencies that are not foreseeable or calculable. Furthermore, an amethyst loses its color with UV radiation. This means that crystal lattice shifts caused by natural irradiation can occur. Thus, for an amethyst crystal, the small plate shape may prove more appropriate as opposed to the shape of a fork oscillator with two prongs.

In particular, a small plate is cut out of a raw amethyst crystal or a raw citrine crystal. Specifically, this is done such that a main surface of the plate is parallel to a plane defined by the Z-crystal axis and the Y-crystal axis or by the Z-crystal axis and the X-crystal axis of the piezoelectric oscillating crystal.

The remaining steps for providing the respective clock generator that comprises an amethyst oscillating crystal or citrine oscillating crystal in the shape of a small plate are like the corresponding steps for providing a respective clock generator that comprises a tourmaline oscillating crystal in the shape of a small plate.

Preferably, the predetermined oscillation frequency and/or the predetermined count value is/are adjusted in such a way and/or a driving device of the wristwatch configured in such a way that a second hand of a mechanical time display device of the wristwatch can be moved at a frequency higher than 1 Hz. For example, if a frequency of 8 Hz is used, then the second hand of the wristwatch does not make a small jump every second, but glides smoothly across the dial. This improves the main visual impression of the wristwatch, as the seconds jump of the second hand is eliminated.

A method for operating a wristwatch with a clock generator assembly, in particular a wristwatch described above with the clock generator assembly described above, advantageously comprises the following steps:

- generating a current clock signal by means of a first clock generator, which includes a piezoelectric oscillating crystal with an oscillator circuit,
- counting the clock signal of the first clock by means of a pulse counter, and
- outputting a useful signal by means of an output device if a count value of the counted clock signal of the clock generator is equal to a predetermined count value.

It should be noted that the piezoelectric oscillating crystal of the first clock generator and/or the second clock generator and/or the third clock generator is/are also independently operable.

Further details, advantages and features of the present invention result from the following description of exemplary embodiments with reference to the drawing.

Figure 2:
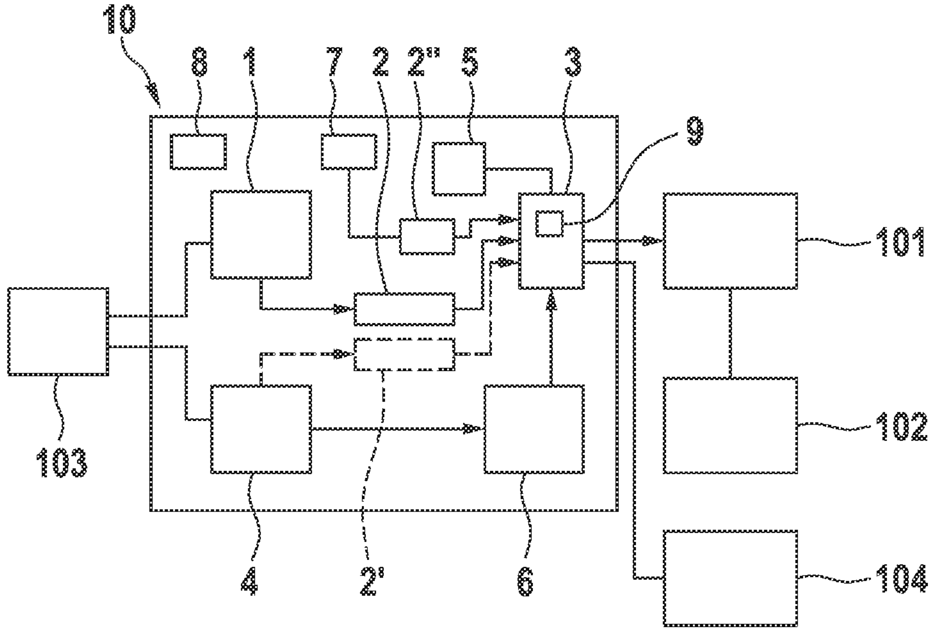
Figure 3:
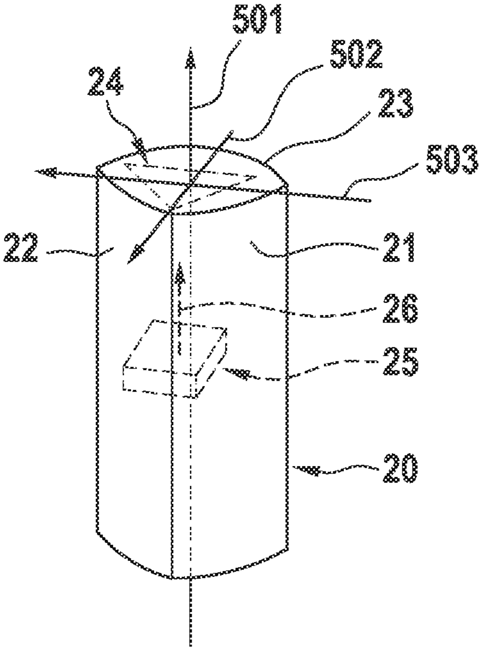
Figure 4:
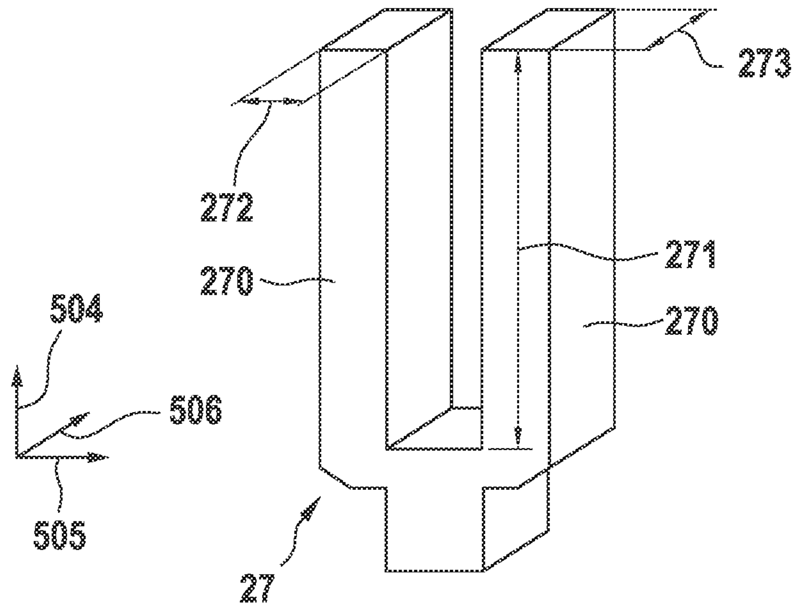

FIG. 1 shows a simplified top view of a wristwatch according to the invention with a clock generator assembly according to an exemplary embodiment of the present invention, FIG. 2 shows a simplified schematic representation of the clock generator assembly of FIG. 1, FIG. 3 is a simplified schematic perspective view of a raw crystal from which a piezoelectric oscillating crystal of a first clock of the clock generator assembly of FIG. 2 is formed, and FIG. 4 is a simplified schematic perspective view of a piezoelectric oscillating crystal of a first clock generator of a clock generator assembly according to a second embodiment of the present invention.

Hereinafter, a wristwatch 100 according to the invention with a clock generator assembly 10 according to an exemplary embodiment of the present invention is described in detail with reference to FIGS. 1 to 3.

As can be seen from FIG. 1, the wristwatch 100 has a case 11 and a watch glass 15 arranged therein. The wristwatch 100 also has a dial 12 and three hands 13 for displaying the hours, minutes and seconds. The hands 13 are parts of a time display device 102. The wristwatch 100 also has two connectors 14 for a bracelet.

The clock generator assembly 10 ensures that a useful signal is generated, which can be received by a driving device 101 for moving the hands 13. The useful signal can also be referred to as a useful clock signal within the context of the invention. How the useful signal is generated will be explained in more detail later with reference to FIG. 2.

The driving device 101 comprises a driving element, which can be directly connected to the mechanical time display device 102. Alternatively, the driving device 101 can, in addition to the driving element, comprise a transmission device formed as a wheel train, which connects the driving element to the mechanical time display device 102 and translates a movement of the driving element into a movement of the mechanical time display device 102. In particular, the driving element can be formed as an electric stepping motor, in particular as a Lavet stepping motor, or as another type of electromechanical drive.

The clock generator assembly 10, the driving device 101 and the mechanical time display device 102 are arranged in the case 11 under the dial 12.

In FIG. 2, the clock generator assembly 10 is shown in more detail.

According to FIG. 2, the clock generator assembly 10 has a first clock generator 1, a pulse counter 2 and an output device 3.

The first clock generator 1 comprises in this exemplary embodiment a piezoelectric oscillating crystal made of tourmaline (also: tourmaline oscillating crystal) and is configured to generate a clock signal. For this purpose, the piezoelectric oscillating crystal of the first clock generator 1 can be made to oscillate at its oscillation frequency (resonance frequency) due to its piezoelectric properties in an oscillator circuit. For supplying the clock generator 1 with electric current, a power supply device 103 is provided in the wristwatch 100. The power supply device 103 can in particular have a battery and/or a rechargeable battery and/or a continuous power generator.

Here, the pulse counter 2 is configured to count a clock signal of the first clock generator 1 during the operation of the wristwatch 100. Thereby, a count value of the counted clock signal of the first clock generator 1 is determined, which is compared in particular by means of the output device 3 with a predetermined count value. The predetermined count value is stored in a memory 9 of the output device 3.

The output device 3 is also configured to output a useful signal based on the result of the comparison or rather if the count value of the counted clock signal of the first clock generator 1 is equal to the predetermined count value.

The useful signal, which is transmitted to the driving device 101, can be a one-second cycle or only a fraction of a second.

In the latter case, the hand 13, which is responsible for displaying the seconds, does not move forward by a jerk every second but a specific fraction of the second. In other words, the useful signal is not sent to the driving device 101 every second, i.e. at a frequency of 1 Hz, but more often, i.e. e.g. every half second or quarter of a second or more often. Thereby, a second hand 13 jumping every second can be avoided. For this purpose, the driving element and/or the transmission device of the driving device 101, which drives the hand movement, is/are designed in such a way that the second hand 13 carries out its movement more or less invisibly, in that the useful signal does not occur 60 times per minute, but a correspondingly higher number of times. When using the pulse counter 2, the adjustment of the interval of movement of the second hand 13 is freely selectable. Only the driving element and/or the transmission device of the driving device 101 must be matched to the timing of the useful signal.

Moreover, the clock generator assembly 10 includes a second clock generator 4, which in this exemplary embodiment has a piezoelectric oscillating crystal made of quartz and is configured to generate a clock signal. In particular, the piezoelectric oscillating crystal of the second clock generator 4 is a synthetic quartz crystal. For generating a clock signal, the piezoelectric oscillating crystal of the first clock generator 1 can be made to oscillate at its oscillation frequency (resonance frequency) in an oscillator circuit due to its piezoelectric properties. Likewise, the oscillating crystal of the second clock generator 4 can also be made to oscillate by its oscillator circuit. For this purpose, the power supply device 103 can supply both the first clock generator and the second clock generator 4 with electric current.

The output device 3 is configured to compare the clock signal of the second clock generator 4 with the clock signal of the first clock generator 1. By this comparison process, the accuracy of the clock signal of the first clock generator 1 can be checked.

In order to save power and thus extend the life of the battery and/or the time until the next charging cycle of the rechargeable battery of the power supply device 103, the second clock generator 4 is configured to generate its clock signal only at predetermined time intervals, e.g. every 15 minutes. That is, the second clock generator 4 is made to oscillate only at predetermined time intervals. Thus, the comparison between the clock signal of the first clock generator 1 and the clock signal of the second clock generator 4 also takes place only at predetermined time intervals.

The quartz oscillating crystal of the second clock generator 4 is preferably formed in such a way that it has an oscillation frequency of 32768 Hz. The advantage of a quartz oscillating crystal is that its oscillation frequency is essentially considered independent from parameters such as e.g. the temperature of the quartz oscillating crystal or its environment.

As can be seen from FIG. 2, the clock generator assembly 10 also has a frequency divider 6, which is configured to halve the oscillation frequency of the quartz oscillating crystal 15 times, 14 times, 13 times or 12 times in order to get to the frequency of 1 Hz, 2 Hz, 4 Hz or 8 Hz, depending on whether the useful signal is a second cycle or a corresponding fraction of a second.

It is, however, also conceivable for the clock generator assembly 10 to also have a further pulse counter 2', which is configured to count the clock signal of the second clock generator 4. This is particularly the case if the selected interval of the movement of the second hand 13 is not achievable by halving the oscillation frequency of the quartz oscillating crystal or if a piezoelectric oscillating crystal other than a standardized quartz crystal is used for the second clock generator 4. The output device 3 can be configured to compare a count value determined by counting the clock signal of the second clock generator 4 with the count value of the counted clock signal of the first clock generator 3.

The output device 3 can in particular be configured to output the useful signal based on the clock signal of the first clock generator 1 if a count of the counted clock signal of the first clock generator 1 is equal to the predetermined count value, only if there is a deviation between the clock signal of the second clock generator 4 and the clock signal of the first clock generator 1 is less than a predetermined deviation.

In the opposite case, that is, if a deviation between the clock signal of the second clock generator 4 and the clock signal of the first clock generator 1 is greater than the predetermined deviation, the output device 3 is configured to output a useful signal based on the clock signal of the second clock generator 4 instead of based on the clock signal of the first clock generator 1. The second clock generator 4 with the quartz oscillating crystal acts here as a substitute clock generator. Thus, e.g. for the time in which the clock would be taken off and a too high temperature drop would trigger a too high frequency difference between the first clock signal and the second clock signal, the second clock generator 4 takes the lead.

Alternatively, in the case of a deviation between the clock signal of the second clock signal 4 and the clock signal of the first clock generator 1 that is greater than the predetermined deviation, the output device 3 can be configured to correct the predetermined count value using a predetermined correction factor. Here, the output device 3 can be configured to output the useful signal if the count value of the clock signal of the first clock generator 1 is equal to the corrected predetermined count value.

For checking the clock accuracy of the clock generator assembly 10, which can be influenced by temperature fluctuations due to the temperature dependence of the oscillation frequency of the tourmaline oscillating crystal of the first clock generator 1, a temperature sensor 5 is, as can be derived from FIG. 2, provided in the clock generator assembly 10. The temperature sensor 5 is configured to detect a temperature of the first clock generator 1 and/or its environment and to compare this with a predetermined temperature.

The predetermined temperature is here the temperature at which the predetermined count was set. If a temperature deviation between the detected temperature and the predetermined temperature is greater than a predetermined temperature deviation, the output device 3 may be configured to correct the predetermined count value based on the detected temperature.

For this purpose, a dependency of the oscillation frequency of the tourmaline oscillating crystal on the temperature must have been predetermined. In other words, the temperature response of the tourmaline oscillating crystal must be measured in advance so that the predetermined count value can be corrected according to the detected temperature of the first clock generator 1 and/or its environment.

The output device 3 is then configured to output the useful signal if the count value of the clock signal of the first clock generator 1 is equal to the corrected predetermined count value.

The detection of the current temperature by means of the temperature sensor 5 and the comparison of the detected current temperature with the predetermined temperature can take place at predetermined intervals.

In addition, the correction parameter can be based on the predetermined temperature dependency of the oscillation frequency of the piezoelectric oscillating crystal of the first clock generator 1, a predetermined temperature dependency of the oscillation frequency of the piezoelectric oscillating crystal of the second clock generator 4, and a difference between a count value of the counted clock signal of the first clock generator 1 and a count value of the counted clock signal of the second clock generator 4.

A further possibility of preventing an oscillation frequency deviation of the clock signal of the first clock generator 1 in the event of a temperature deviation is to always keep the first clock generator 1 at a constant temperature. For this purpose, a heating device 8, in particular a heating coil, can be provided in addition to the temperature sensor 5. The heating device 8 is configured to raise the temperature of the first clock generator 1 back to the predetermined temperature in the event of a deviation. The predetermined temperature corresponds to the highest temperature normally aimed for by means of the heating device 8.

Preferably, the clock generator assembly 10 also comprises a third clock generator 7. The third clock generator 7 comprises a piezoelectric oscillating crystal and is configured to generate a clock signal. For example, the piezoelectric oscillating crystal of the third clock generator 7 can be a synthetic standardized quartz oscillating crystal.

For counting the clock signal of the third clock generator 7, the clock generator assembly can have a further pulse counter 2". In this case, the output device 3 is configured to compare the clock signal of the third clock generator 7, the clock signal of the second clock generator 4 and the clock signal of the first clock generator 1 with one another. From the result of this comparison, aging-related oscillation frequency deviations of the piezoelectric oscillating crystal of the first clock generator 1 can also be discovered, which can then also be corrected.

It should be noted that the clock generator assembly 10, in particular the pulse counter 2 and/or the pulse counter 2' and/or the pulse counter 2" and/or the output device 3, can be formed as a component, e.g. an application-specific integrated circuit (ASIC). Alternatively, the clock generator assembly 10, in particular the pulse counters 2, 2', 2" and the output device 3, can be parts of a microcontroller.

It should also be noted that the first clock generator 1 is the primary clock generator of the clock generator assembly 10, wherein the second clock generator 4 and/or the third clock 7 can serve as a backup clock generator if it is determined that the clock accuracy of the first clock generator 1 is not high enough, and/or are to be understood as a control generator clock so that the accuracy of the first clock generator 1 can be checked and, if necessary, corrected.

The wristwatch 100 can also include a device 104 with a digital display device, by means of which the current frequency of the clock signal of the first clock generator 1 is displayed. Alternatively or additionally, the device 104 can include an interface via which an external device can read out the current frequency of the first clock generator 1. In particular, if there is a temperature deviation between the detected temperature and the predetermined temperature that is greater than a predetermined temperature deviation, the current temperature of the first clock generator 1 and thus also the current frequency of the clock signal of the first clock generator 1 can be determined. Displaying the current frequency of the clock signal of the first clock generator 1 can serve as evidence that the first clock generator 1 is in fact the primary clock generator of the clock generator assembly 10.

How the piezoelectric oscillating crystal made of tourmaline, i.e. the tourmaline oscillating crystal, of the first clock generator 1 is produced is explained below with reference to FIG. 3.

A raw tourmaline crystal 20 is shown in FIG. 3.

It results from FIG. 3 in particular that the raw tourmaline crystal 20 has a trigonal structure. In other words, the tourmaline crystallizes trigonally, i.e. in the shape of a triangle. The raw tourmaline crystal 20 has a first crystallographic axis 501, a second crystallographic axis 502 and a third crystallographic axis 503.

The first crystallographic axis 501 corresponds to the longitudinal crystallographic axis of the tourmaline raw crystal 20. The second crystallographic axis 502 is perpendicular to the first crystallographic axis 501 and runs through an angle that is formed between a first facet 21 and a second facet 22 of the tourmaline raw crystal 20. The second axis 502 can be referred to as the TA axis (TA: Triangle—Angle). The third crystallographic axis 503 of the raw tourmaline crystal 20 is perpendicular to the first crystallographic axis 501 and runs essentially parallel to the basic direction of the slightly curved third facet 23 of the tourmaline oscillating crystal. The third crystallographic axis 503 is referred to as TS axis (TS: tourmaline side).

The raw tourmaline crystal 20 can be described by a structural triangle 24 or the cross section of the raw tourmaline crystal 20 perpendicular to the first crystallographic axis 501 can be approximated by a structural triangle 24, the sides of which are associated with or follow the facets 21, 22, 23 of the raw tourmaline crystal 20. Thus, the first crystallographic axis 501 is perpendicular to the plane of the structural triangle 24, while the second crystallographic axis 502 is perpendicular to the first crystallographic axis 501 and runs through an angle that is formed between two of the three sides of the structural triangle 24. The third crystallographic axis 503 is perpendicular to the first crystallographic axis 501 and parallel to one of the three sides of the structure triangle 24.

A tourmaline small plate 25 is cut out of the raw tourmaline crystal 20 at an angle of 90° to the first crystallographic axis 501. Thus, a normal vector 26 of a main surface of the tourmaline small plate 25 is parallel to the first crystallographic axis 501. Alternatively, a tourmaline small plate 25 can be cut from the raw tourmaline crystal 20 at an angle of 45° to the first crystallographic axis, or at any optimum angle which corresponds to the specific chemical structure of the particular type of tourmaline used. The described wristwatch 100 with the clock generator assembly 10 ensures on the one hand the advantages of a high accuracy, a compact design and an unlimited power reserve that a clock generator assembly with a quartz oscillating crystal has. On the other hand, the wristwatch does however not have a mass-produced quartz movement, so it does not have the negative image of a conventional quartz movement.

Although in the wristwatch 100 according to the described embodiment the first clock generator 1 comprises a tourmaline crystal, it is also possible that the first clock generator 1 comprises a piezoelectric oscillating crystal made of another material such as amethyst or citrine instead of a tourmaline crystal.

FIG. 4 relates to a wristwatch 100 according to a second embodiment. In FIG. 4, a piezoelectric oscillating crystal of the first clock generator 1 of the clock generator assembly 10 of the wristwatch 100 according to the second exemplary embodiment is in particular shown.

A difference between the wristwatch 100 according to the first embodiment and the the wristwatch 100 according to the second embodiment is that the piezoelectric oscillating crystal of the first clock generator 1 of the clock generator assembly 10 of the wristwatch 100 according to the second embodiment is a quartz oscillating crystal and formed as a fork oscillator 27 with two prongs 270.

The length 271 of each prong 270 is preferably 3.02127 mm, the thickness 272 of each prong 270 is preferably 0.3 mm, and the depth 273 of each prong 270 is 0.6 mm or another practical depth that does not affect the frequency. In this case, the oscillation frequency of the piezoelectric oscillator crystal, i.e. the fork oscillator 27, of the first clock generator 1 is 8888 Hz. Alternatively, the length 271 of each prong 270 can preferably also be 0.55155 mm, the thickness 272 of each prong 270 can preferably also be 0.1 mm and the depth 273 of each prong 270 can preferably also be 0.3 mm. In this case, the oscillation frequency of the piezoelectric oscillating crystal, i.e. the fork oscillator 27, is 88888 Hz.

In this case, the length 271 corresponds to the dimension of the respective prong 270 in a direction essentially parallel to the Y-crystal axis 504, the thickness 272 to the dimension of the respective prong 270 in a direction essentially parallel to the X-crystal axis 505 and the depth 273 to the dimension of the respective prong 270 in a direction substantially parallel to the Z-crystal axis 506 of the quartz oscillating crystal of the first clock generator 1.

In particular, for providing the piezoelectric oscillating crystal of the first clock generator 1, the oscillation frequency of 8888 Hz or 88888 Hz is first selected as a predetermined oscillation frequency of the piezoelectric oscillating crystal of the first clock generator 1 and then formed as the described fork oscillator 27.

The wristwatch 100 according to this exemplary embodiment has, in addition to its high clock accuracy, the additional advantage that it is individualized due to the selected frequency of 8888 Hz or 88888 Hz for the piezoelectric oscillating crystal of the first clock generator 1 and is therefore not perceived as a mass product.

It is also possible that the fork vibrator 27 is provided with another predetermined oscillation frequency. For example, the predetermined oscillation frequency may correspond to the date of birth of the owner of the wristwatch 100.

In addition to the above written description of the invention, reference is hereby explicitly made to the graphic representation of the invention in FIGS. 1 to 4 for its supplementary disclosure.

REFERENCE LIST

1 clock generator
2 pulse counter
2' pulse counter
2" pulse counter
3 output device
4 second clock generator
5 temperature sensor
6 frequency divider
7 third clock generator
8 heating device
9 memory
10 clock generator assembly
11 case
12 dial
13 hand
14 connector
15 watch glass
20 tourmaline raw crystal
21 first facet
22 second facet
23 third facet
24 structural triangle
25 tourmaline small plate
26 normal vector
27 fork oscillator
100 wristwatch
101 driving device
102 mechanical time display device
103 power supply device
104 device
270 prong
271 length
272 thickness
273 depth
501 first crystallographic axis
502 second crystallographic axis
503 third crystallographic axis
504 Y-crystal axis
505 X-crystal axis
506 Z-crystal axis

The invention claimed is:

1. A wristwatch with a clock generator assembly, wherein the clock generator assembly comprises:
- a first clock generator, which comprises a piezoelectric oscillating crystal and is configured to generate a first clock signal,
- a second clock generator that is a substitute clock generator, which comprises a piezoelectric oscillating crystal and is configured to generate a second clock signal that is a substitute clock signal,
- a pulse counter, which is configured to count the clock signal of the first clock generator, and
- an output device, which is configured to output a useful signal if a count value of the counted clock signal of the first clock generator is equal to a predetermined count value, wherein the output device is configured to compare the substitute clock signal of the second clock generator with the first clock signal of the first clock generator, and wherein the useful signal is based on the substitute clock signal of the substitute clock generator instead of based on the first clock signal of the first clock generator if a deviation between the substitute clock signal of the substitute clock generator and the first clock signal of the first clock generator is greater than a predetermined deviation.

2. The wristwatch according to claim 1, wherein the output device is configured to output the useful signal if a count value of the counted clock signal of the first clock generator is equal to the predetermined count value, only if a deviation between the substitute clock signal of the second clock generator and the first clock signal of the first clock generator is less than a predetermined deviation.

3. The wristwatch according to claim 1, wherein the output device is configured to correct the predetermined count value and determine a corrected predetermined count value by means of a predetermined correction factor, if a deviation between the substitute clock signal of the second clock generator and the first clock signal of the first clock generator is greater than the predetermined deviation, wherein the output device is configured to output the useful signal if the count value of the first clock signal of the first clock generator is equal to the corrected predetermined count value.

4. The wristwatch according to claim 3, wherein the predetermined correction factor is based on a predetermined temperature dependency of the oscillation frequency of the piezoelectric oscillating crystal of the first clock generator, a predetermined temperature dependency of the oscillation frequency of the piezoelectric oscillating crystal of the second clock generator and a difference between the count value of the counted clock signal of the first clock generator and a count value of the counted clock signal of the second clock generator.

5. The wristwatch according to claim 1, comprising a temperature sensor, which is configured to detect a temperature of the first clock generator and/or an environment of the first clock generator and to compare it with a predetermined temperature, wherein:

the output device is configured to correct the predetermined count value based on the detected temperature, if a temperature deviation between the detected temperature and the predetermined temperature is greater than a predetermined temperature deviation, wherein the output device is configured to output the useful signal if the count value of the first clock signal of the first clock generator is equal to the corrected predetermined count value, and/or the wristwatch further has a heating device, which is configured to heat the first clock generator to the predetermined temperature, if a temperature deviation between the detected temperature of the first clock generator and/or an environment of the first clock generator and the predetermined temperature is greater than a predetermined temperature deviation.

6. The wristwatch according to claim 1, wherein the clock generator assembly further comprises a third clock generator, which is configured to generate a third clock signal and comprises a piezoelectric oscillating crystal, wherein the output device is configured to compare the substitute clock signal of the second clock generator, the third clock signal of the third clock generator and the first clock signal of the first clock generator with one another.

7. The wristwatch according to claim 1, further comprising:

a driving device, and a mechanical time display device, wherein the driving device is configured to receive the useful signal output by means of the output device and in response thereto, move the time display device.

8. The wristwatch according to claim 1, wherein the piezoelectric oscillating crystal of the first clock generator and/or the second clock generator and/or a third clock generator is a natural or synthetic crystal.

9. The wristwatch according to claim 1, wherein the oscillation frequency of the piezoelectric oscillating crystal of the first clock generator is 8888 Hz or 88888 Hz and/or the output device is configured to output the useful signal with a frequency of 8 Hz, if the count value of the counted clock signal of the first clock generator is equal to a predetermined count value.

10. The wristwatch according to claim 9, wherein the piezoelectric oscillating crystal of the first clock generator is a quartz crystal, and is formed as a fork oscillator with two prongs.

11. The wristwatch according to claim 1, wherein the piezoelectric oscillating crystal of the first clock generator and/or the second clock generator and/or a third clock is a tourmaline crystal and has the shape of a small plate.

12. The wristwatch according to claim 1, wherein the piezoelectric oscillating crystal of the first clock generator and/or the second clock generator and/or a third clock generator is an amethyst oscillating crystal or a citrine oscillating crystal and has the shape of a small plate.

13. A method for producing a wristwatch with a clock generator assembly according to claim 1, comprising the steps:

providing a first clock generator, which comprises a piezoelectric oscillating crystal with a predetermined oscillation frequency and is configured to generate a clock signal, providing a pulse counter, which is configured to count a clock signal of the first clock generator, providing an output device, storing a predetermined count value, which is derivable from the predetermined oscillation frequency, in a memory of the pulse counter or the output device, configuring the output device to output a useful signal if a count value of the clock signal counted by the pulse counter of the first timer is equal to the predetermined count value, and installing the first clock generator, the pulse counter and the output device in the watch.

14. The method according to claim 13, wherein the step of providing the first clock generator with the piezoelectric oscillating crystal having the predetermined oscillation frequency comprises the following steps:

providing an arbitrary piezoelectric oscillating crystal, generating an oscillation of the piezoelectric oscillating crystal, and measuring the oscillating piezoelectric oscillating crystal by means of a frequency counter to determine its oscillation frequency, which corresponds to the predetermined oscillating frequency.

15. The method according to claim 13 wherein the step of providing the first clock generator with the piezoelectric oscillating crystal, which has the predetermined oscillation frequency comprises the following steps:

selecting an oscillation frequency as the predetermined oscillation frequency, and shaping or refining by removing material by means of a laser, a piezoelectric oscillating crystal from a raw crystal in such a way that the oscillating crystal has the predetermined oscillation frequency.

16. The method according to claim 15, wherein the frequency of 8888 Hz or 88888 Hz is selected as the predetermined oscillation frequency, and/or wherein the predetermined oscillation frequency and/or the predetermined count value is/are selected such that the output device is configured to output the useful signal with a frequency of 8 Hz, if the count value of the counted clock signal of the first clock generator is equal to the predetermined count value.

17. The method according to claim 13, wherein the predetermined oscillation frequency and/or the predetermined count value is/are set in such a way and/or wherein a driving device of the wristwatch is configured in such a way that a second hand of a mechanical time display device of the wristwatch is movable at a frequency higher than 1 Hz.

18. The wristwatch according to claim 8, wherein a respective piezoelectric oscillating crystal is a natural tourmaline, citrine, amethyst, Swiss rock crystal or a synthetic quartz crystal.

19. The wristwatch according to claim 10, wherein for an oscillation frequency of the piezoelectric oscillating crystal of the first clock generator of 8888 Hz, the length of each prong is 3.02127 mm, the thickness of each prong is 0.3 mm and the depth of each prong is 0.6 mm.

20. The wristwatch according to claim 10, wherein for an oscillation frequency of the piezoelectric oscillating crystal of the first clock generator of 88888 Hz, the length of each prong is 0.55155 mm, the thickness of each prong is 0.1 mm and the depth of each prong is 0.3 mm.

* * * * *